(12) United States Patent
Mese et al.

(10) Patent No.: US 9,401,179 B2
(45) Date of Patent: Jul. 26, 2016

(54) CONTINUING MEDIA PLAYBACK AFTER BOOKMARKING

(71) Applicant: Lenovo (Singapore) Pte. Ltd., Singapore (SG)

(72) Inventors: John Carl Mese, Cary, NC (US); Russell Speight VanBlon, Raleigh, NC (US); Nathan J. Peterson, Durham, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 76 days.

(21) Appl. No.: 14/331,563

(22) Filed: Jul. 15, 2014

(65) Prior Publication Data

US 2016/0019934 A1    Jan. 21, 2016

(51) Int. Cl.
*H04N 9/80* (2006.01)
*G11B 27/30* (2006.01)

(52) U.S. Cl.
CPC .................................. *G11B 27/30* (2013.01)

(58) Field of Classification Search
CPC ........................................................ G11B 27/30
USPC .................................. 386/241, 239, 248, 262
See application file for complete search history.

(56) References Cited

U.S. PATENT DOCUMENTS

2011/0047571 A1*  2/2011  Zhang ............... H04N 7/17318
                                                        725/40

* cited by examiner

*Primary Examiner* — Robert Chevalier
(74) *Attorney, Agent, or Firm* — Ference & Associates LLC

(57) ABSTRACT

One embodiment provides a method, including: identifying, using a processor, a consumer of media content; detecting, using data derived from a device selected from the group consisting of an image capture device and an audio capture device, a trigger event associated with the consumer; and creating, using a processor, a bookmark at a location in the media content associated with the detection of the trigger event. Other embodiments are described and claimed.

20 Claims, 3 Drawing Sheets

CONTINUING MEDIA PLAYBACK AFTER BOOKMARKING

BACKGROUND

Information handling devices, for example, laptop computers, flat panel displays, smart TVs, tablet devices, smart phones, and the like are regularly used for playing media content (e.g., videos, music, TV shows, movies, audio books, etc.). Often times more than one person will be partaking in the consumption of the media content at the same time. However, if one person needs to leave the room while consuming the media content, the rest of the group must either pause the media or continue consuming the media without that person. If the group continues playing the media content, the first person will generally have to catch up later by using rewind or fast forward to find the spot in the media content corresponding to the time in which they stopped consuming the media.

In some cases, content providers will place a bookmark designating the spot in which the media content was stopped or paused. Some content providers may also allow a user to manually place a bookmark at a location in the media content. However, once the media content resumes playing this bookmark is deleted. A new bookmark may then be placed if the media content is paused/stopped again before the end of the media content.

BRIEF SUMMARY

In summary, one aspect provides a method, comprising: identifying, using a processor, a consumer of media content; detecting, using data derived from a device selected from the group consisting of an image capture device and an audio capture device, a trigger event associated with the consumer; and creating, using a processor, a bookmark at a location in the media content associated with the detection of the trigger event.

Another aspect provides an information handling device, comprising: at least one sensor; at least one processor operatively coupled to the sensor; a memory storing instructions executable by the processor to: identify a consumer of media content; detect, using the at least one sensor, a trigger event associated with the consumer; and create a bookmark at a location in the media content associated with the detection of the trigger event.

A further aspect provides a product, comprising: a storage device having code stored therewith and executable by a processor, the code comprising: code that identifies a consumer of media content; code that detects a trigger event associated with the consumer; and code that creates a bookmark at a location in the media content associated with the detection of the trigger event.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
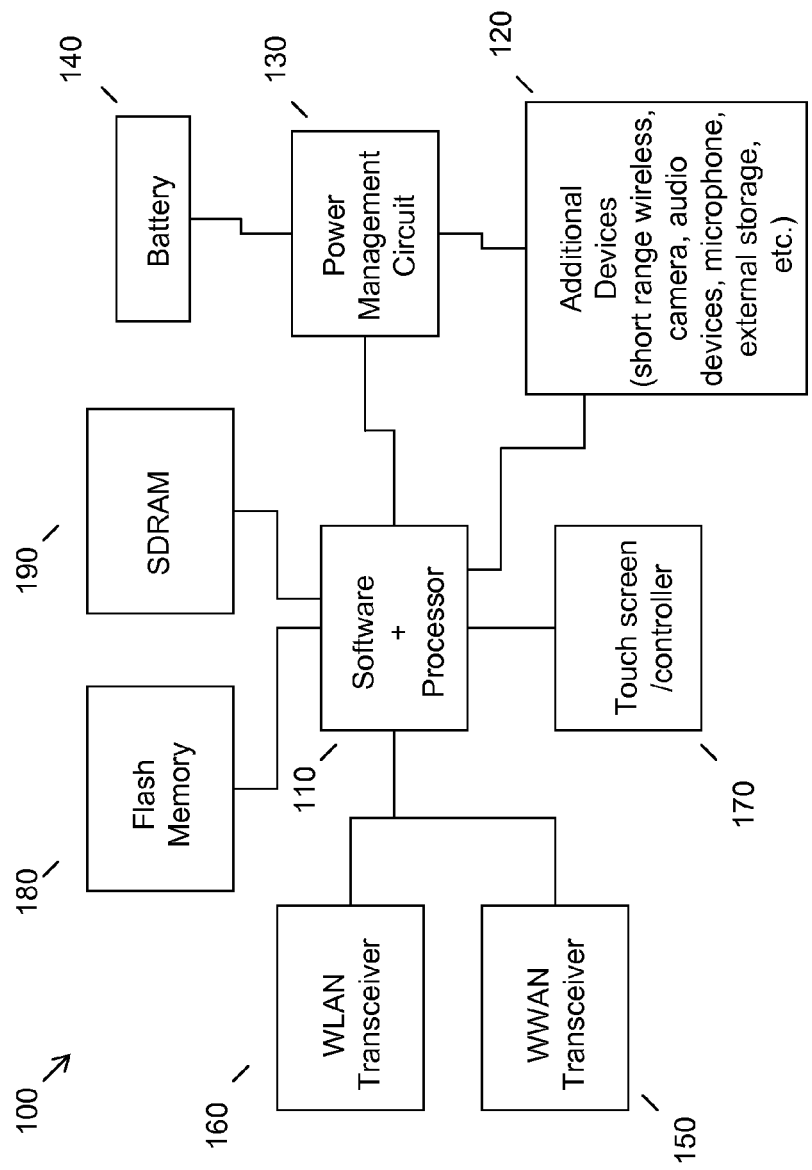
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

People have the option of consuming (e.g., watching, listening, etc.) media content, for example, music, videos, TV shows, movies, audio talk shows, audio books, and the like, on many different information handling devices (e.g., smart phones, tablets, laptop computers, TVs, etc.) Many people like to consume media content (e.g., audio content, video content, both audio and video content, etc.) while in a group setting. For example, people may watch TV shows on a laptop with friends or family. When consuming this media content, playback control is done for the entire group. If the media content is paused or stopped, every user in the group watching or listening has to resume from the same point.

Additionally, if one person leaves the room while consuming the media content and the remaining group members continue play of the media content, the person has to catch up at a later time. Generally, to catch up the person has locate the place in the media content by rewinding or fast forwarding the media content until they find the appropriate location. In some cases, content providers may automatically place a bookmark when the media content is stopped or paused. For example, if a person is watching a video on their smart phone and the smart phone is turned off while in the middle of the video, the content provider may place a bookmark at this location in the content. The consumer is thereby allowed to resume the video from the location in the media content in which the smart phone lost power.

Alternatively or additionally, some content providers may allow a user to manually place a bookmark at a location within the media content. This may allow a single consumer to find the location corresponding to their stopping location at a later time more quickly. These methods, however, do not allow for more than one bookmark to be placed. Additionally, once a bookmark is placed, the media content stops playing.

If the media continues then the bookmark may be overwritten or deleted. This does not allow the remaining group members to continue consuming the media content.

Accordingly, an example embodiment provides a method of identifying a consumer of media content. For example, an embodiment may use a recognition device (e.g., image capture device, biometric data capture device, user credential data, etc.) to identify the consumer of the media content. An embodiment may then detect a trigger event, for example, the consumer leaving the range of the media content, the consumer falling asleep during the consumption of the media content, the consumer being interrupted during the consumption of the media, and the like. An embodiment may then automatically create a bookmark at the location in the media content associated with the timing of the trigger event. The media content may then continue playing without pausing or stopping the media content.

A further example embodiment may identify more than one consumer of the media content. If a trigger event is detected for one of the consumers of the media content, an embodiment may create a bookmark associated with that identified consumer at the location of the trigger event. The media content may then continue to play. If a trigger event is detected associated with another consumer of the media, then an embodiment may create a bookmark associated with this consumer at the location in the media content associated with the additional trigger event. This bookmark would not overwrite or delete the bookmark already created in the media content. This creation of bookmarks per consumer is not limited to just one or two consumers of the media content.

An additional example embodiment may allow a consumer to resume play of the media content at the location of the bookmark associated with that consumer. One embodiment may request that the consumer choose a bookmark in which to resume play of the media content, i.e., when there are multiple bookmarks present, a prompt may be presented asking "Where should playback begin?". Alternatively or additionally, an embodiment may detect and identify the consumer and automatically resume play of the media content at the location of that identified consumer's bookmark. An embodiment may also notify a consumer if they have reached a subsequent bookmark. For example, if one consumer is trying to catch up to where a family member stopped consuming the media content, an embodiment may notify the consumer that they have reached the family member's bookmark.

One example embodiment may associate a particular identified consumer with a user account over a global computer network. This embodiment may then allow a consumer to start consuming media at one location and, if the consumer leaves the location before the end of the media content, create a bookmark associated with the consumer. The bookmark may then be associated with their user account and may be stored separate from the location of the consumption (i.e., in the cloud). The consumer may then be able to log into their user account at a second location and continue consuming the media at the point in which the consumer stopped their media consumption at the first location. For example, if a person was listening to an audio talk show at a friend's house but had to leave halfway through the audio talk show, they could log into their account at their own house and finish listening to the audio talk show starting from the point of the bookmark.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included, e.g., recognition devices such as a camera, a biometric scanner, and the like. System 100 often includes a touch screen 170 for data input and display/rendering. System 100 also typically includes various memory devices, for example flash memory 180 and SDRAM 190.

Figure 2:
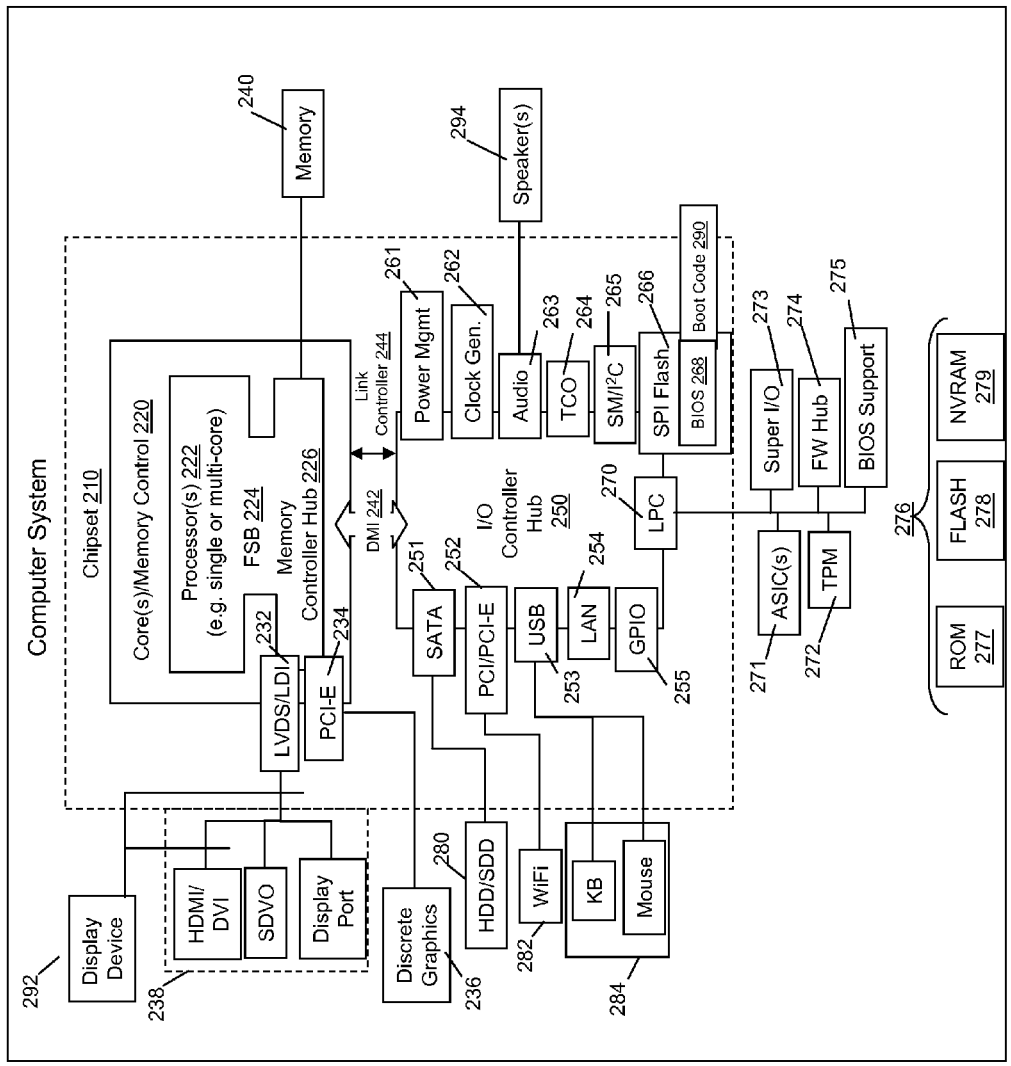
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a flat panel display, touch screen, a TV, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, biometric scanners, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or other electronic devices which consumers use to consume media content. For example, the circuitry outlined in FIG. 1 may be implemented in a tablet or smart phone embodiment, whereas the circuitry outlined in FIG. 2 may be implemented in a personal computer embodiment.

Figure 3:
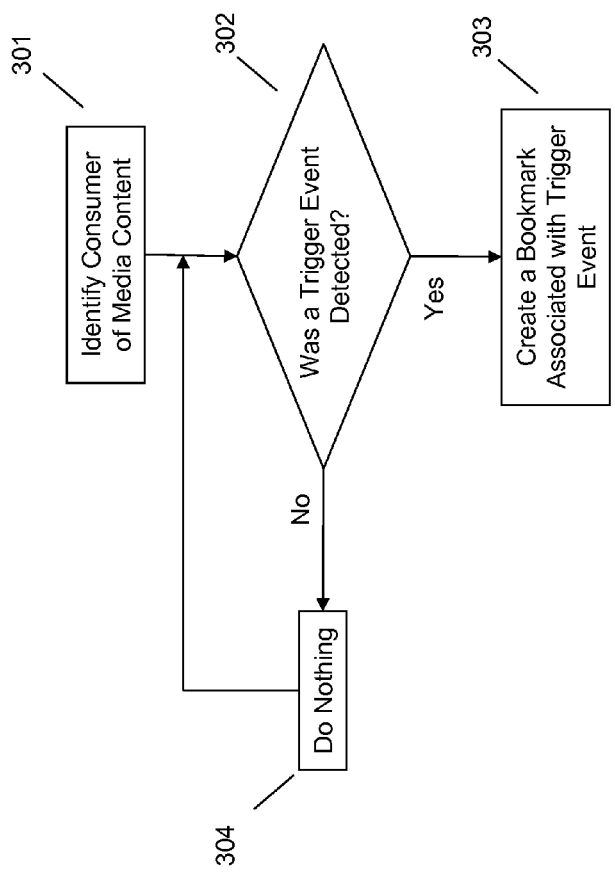
FIG. 3 illustrates an example method of continuing playback of media after bookmarking.

Referring to FIG. 3, an embodiment may use a processor to identify a consumer of media content at 301. In one embodiment, this identification may be completed by using user credential data. For example, the consumer may consume media content that is based on an application (e.g., NETFLIX, PANDORA, AMAZON Instant Video, etc.) that requires the consumer to log into the application. NETFLIX is a registered trademark of Netflix, Inc. in the United States and other countries. PANDORA is a registered trademark of Pandora Media, Inc. in the United States and other countries. AMAZON is a registered trademark of Amazon Technologies, Inc. in the United States and other countries. Once the consumer has logged into the application, the processor at 301 may identify the consumer as the user logged into the application.

Alternatively, the application may be based in the operating system (e.g., WINDOWS, LINUX, ANDROID, etc.) of the information handling device. WINDOWS is a registered trademark of Microsoft Corporation in the United States and other countries. LINUX is a registered trademark of Linus Torvalds in the United States and other countries. ANDROID is a registered trademark of Google Inc. in the United States and other countries. Examples of such applications based in the operating system are WINDOWS media player, ITUNES, and the like. ITUNES is a registered trademark of Apple Inc. in the United States and other countries. The processor at 301 may use the user credentials that were used to log into the operating system to identify the consumer of the media content.

Alternatively or additionally, the identification at 301 may use biometric or image recognition data. For example, an embodiment may identify a consumer using a fingerprint scanner, palm print scanner, voice recognition software, or other such biometric data. The devices to capture this data may be included on the information handling device or may be a stand alone device connected to the information handling device (e.g., plugged into a connection port on the information handling device, connected through wireless communications, etc.).

One embodiment may have an image capture device to identify a consumer of media content. For example, the information handling device may have an onboard camera, may be connected to another device that has an image capture device (e.g., XBOX Kinect, WII, PLAYSTATION, etc.), and the like. XBOX is a registered trademark of Microsoft Corporation in the United States and other countries. WII is a registered trademark of Nintendo of America, Inc. in the United States and other countries. PLAYSTATION is a registered trademark of Sony Computer Entertainment Inc. in the United States and other countries. Depending on the type of identification device, the identification at 301 may include identifying multiple consumers in the location.

At 302, one embodiment may detect a trigger event associated with the consumer identified at 301. One trigger event may include a consumer no longer actively consuming the media content. For example, an embodiment may detect that the consumer is no longer in the range of the media content. This detection may be achieved by using an image capture device and concluding that the consumer is no longer within the range of the image capture device. For example, if a consumer is watching a movie using their XBOX, the XBOX may use the onboard image capture device to detect that the consumer has walked out of the room where the XBOX is located.

Additionally or alternatively, this detection may be achieved by determining that an additional information handling device is no longer within communication range of the information handling device playing the media content. For example, if a consumer is using a wireless communication device on their laptop computer to display a video on a TV, an embodiment may detect that the laptop computer is no longer within communication range if the consumer moves the laptop computer to a new location.

One embodiment may determine that the consumer is no longer consuming the media content by determining that the consumer is still within the range of the media content but is no longer consuming the media. For example, an embodiment may detect that the consumer has fallen asleep. An embodiment may use an image capture device to detect that the consumer's eyes are no longer open. Another example may include an embodiment determining that the consumer has been interrupted and is no longer looking at the information handling device. Again, an embodiment may use an image capture device to determine this. Additionally or alternatively, an embodiment may determine that the consumer has been interrupted by using a microphone or other audio capture device to determine that the consumer is talking or that there is another person in the room talking.

If an embodiment determines that a trigger event has not occurred at 302, then it may do nothing at 304 and wait for a trigger event to occur at 302. If, however, an embodiment detects a trigger event then it may create a bookmark at the location in the media content at 303. This bookmark location may correspond to the time that the trigger event was detected at 302. For example, if a consumer is listening to an audio book and at thirteen minutes, four seconds into the audio book, the consumer is interrupted, an embodiment may create a bookmark in the audio book at the time thirteen minutes, four seconds. In one embodiment, after creating the bookmark, play of the media content may continue.

In one embodiment, the bookmark created in 303 may be associated with the consumer identified in 301. For example, if consumer A is watching a TV show using NETFLIX and leaves the room thirty minutes into the TV show, an embodiment may create a bookmark at 303 that is listed as A's bookmark. This bookmark may be additionally associated with the application or user account that is being used to consume the media content. In other words, in one embodiment a consumer may log into that application on a different information handling device and access the bookmark previously associated with the consumer and application.

Additionally or alternatively, if a consumer is consuming media content in one location and then leaves that location, an example embodiment may send the bookmark information to an additional device to be stored until the consumer is in a second location. For example, if a consumer is in one location listening to music using PANDORA, and then leaves that location, an embodiment may send the bookmark location to the consumer's smart phone. Then when the consumer is in a second location and accesses PANDORA the smart phone may transmit that information to the application, thereby allowing the user to resume from the bookmarked location.

One embodiment may identify multiple consumers of the media content at 301. An embodiment may then detect a trigger event associated with one consumer and may create a bookmark associated with that consumer. An embodiment may then detect a trigger event associated with a second consumer. The embodiment may then create a bookmark associated with this second consumer. For example, consumer A is watching a TV show with another person, consumer B. One embodiment may identify that both A and B are watching the TV show. Consumer A leaves the room. One embodiment may create a bookmark at that location in the media content, the bookmark being associated with A (i.e., A's bookmark). An embodiment may continue playing the media content. Consumer B gets interrupted while continuing to watch the TV show. An embodiment may create an additional bookmark being associated with B (i.e., B's bookmark). This second bookmark may not overwrite or replace A's bookmark, so both bookmarks are viewable. An embodiment is not limited to just two consumers and may create a new bookmark for any unique consumer.

Once a bookmark has been created at 303, an embodiment allows a consumer to play the media content starting from the location of the bookmark. One embodiment resumes this play automatically by detecting and identifying the consumer. An embodiment may locate the bookmark associated with this consumer and resume play from the point of the bookmark. Alternatively or additionally, an embodiment may request, using a user interface, that the consumer choose a bookmark from which to resume play of the media content. Once the consumer selects which bookmark from which to resume play, an embodiment may then resume play of the media content from that location.

In addition to resuming play of the media content from a bookmark, an embodiment may notify a consumer that they have reached a subsequent bookmark. Such notifications may be in the form of a graphical user interface, a sound, pausing the media content, or the like. For example, a consumer may want to catch up to another consumer but may not want to exceed where the second consumer is within the media content. An embodiment may notify the consumer when they reach this second bookmark.

Accordingly, as illustrated by the example embodiment and the figures, an embodiment identifies a consumer of media content, detects a trigger event, and creates a bookmark in the media content at the location associated with the trigger event. This may allow a consumer to resume play from the point of the trigger event without having to rewind or fast forward to find the location in the media content that the consumer may have missed. Additionally other consumers of the media content may continue playing the media without interruption of their media consumption experience. If a trigger event occurs with regard to these other consumers, an embodiment may also create additional bookmarks and associate these bookmarks with the other consumers. These multiple bookmarks allow many consumers of the same media content to quickly find the location in the media content that they were last consuming and resume play of the media content from this point.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    identifying, using a processor, a consumer of media content;
    detecting, using data derived from a device selected from the group consisting of an image capture device and an audio capture device, a trigger event associated with the consumer; and
    creating, using a processor, a bookmark at a location in the media content associated with the detection of the trigger event.

2. The method of claim 1, wherein the trigger event comprises the consumer is no longer consuming the media content.

3. The method of claim 1, wherein the bookmark is associated with the identified consumer.

4. The method of claim 3, further comprising:
    identifying a second consumer of media content;
    detecting a trigger event associated with the second consumer of media data; and
    creating a second bookmark associated with the second consumer, at a location in the media content associated with the detection of the trigger event associated with the second consumer.

5. The method of claim 4, further comprising:
    requesting a consumer to choose a bookmark to resume the play of the media content; and
    resuming the play of the media content at the location of the selected bookmark.

6. The method of claim 4, further comprising:
    detecting a consumer of the media content;
    identifying a consumer of the media content; and
    resuming the play of the media content at the location of the bookmark associated with the identified consumer.

7. The method of claim 4, further comprising:
    resuming the play of the media content at the location of a bookmark; and
    notifying a consumer when a subsequent bookmark has been reached.

8. The method of claim 3, further comprising:
    associating an identified consumer with a user account.

9. The method of claim 1, wherein the identifying comprises identification using data selected from the group consisting of biometric data and image recognition data.

10. The method of claim 1, further comprising continuing play of the media content.

11. An information handling device, comprising:
    at least one sensor;
    at least one processor operatively coupled to the sensor;
    a memory storing instructions executable by the processor to:
    identify a consumer of media content;
    detect, using the at least one sensor, a trigger event associated with the consumer; and
    create a bookmark at a location in the media content associated with the detection of the trigger event.

12. The information handling device of claim 11, wherein the trigger event comprises the consumer is no longer consuming the media content.

13. The information handling device of claim 11, wherein the bookmark is associated with the identified consumer.

14. The information handling device of claim 13, further comprising to:
    identify a second consumer of media content;
    detect a trigger event associated with the second consumer of media data; and
    create a second bookmark associated with the second consumer, at a location in the media content associated with the detection of the trigger event associated with the second consumer.

15. The information handling device of claim 14, further comprising to:
    request a consumer to choose a bookmark to resume the play of the media content; and
    resume the play of the media content at the location of the selected bookmark.

16. The information handling device of claim 14, further comprising to:
    detect a consumer of the media content;
    identify a consumer of the media content; and
    resume the play of the media content at the location of the bookmark associated with the identified consumer.

17. The information handling device of claim 14, further comprising to:
    resume the play of the media content at the location of a bookmark; and
    notify a consumer when a subsequent bookmark has been reached.

18. The information handling device of claim 13, further comprising to:
    associate an identified consumer with a user account.

19. The information handling device of claim 11, wherein to identify comprises using data selected from the group consisting of biometric data and image recognition data.

20. A product, comprising:
    a storage device having code stored therewith and executable by a processor, the code comprising:
    code that identifies a consumer of media content;
    code that detects a trigger event associated with the consumer; and
    code that creates a bookmark at a location in the media content associated with the detection of the trigger event.

* * * * *